(12) United States Patent
Baumgarte et al.

(10) Patent No.: US 10,673,993 B2
(45) Date of Patent: *Jun. 2, 2020

(54) COMMUNICATION PROTOCOLS FOR ELECTRONIC LOCKS

(71) Applicant: Schlage Lock Company LLC, Carmel, IN (US)

(72) Inventors: Joseph W. Baumgarte, Carmel, IN (US); Scott Daub, Littleton, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,159

(22) Filed: Jun. 4, 2019

(65) Prior Publication Data

US 2019/0356761 A1    Nov. 21, 2019

Related U.S. Application Data

(63) Continuation of application No. 15/799,283, filed on Oct. 31, 2017, now Pat. No. 10,313,491, which is a
(Continued)

(51) Int. Cl.
| | |
|---|---|
| *H04L 29/06* | (2006.01) |
| *H04W 12/06* | (2009.01) |
| *H04W 48/02* | (2009.01) |
| *G07C 9/00* | (2020.01) |
| *H04W 12/08* | (2009.01) |
| *H04W 12/00* | (2009.01) |
| *H04W 84/12* | (2009.01) |

(52) U.S. Cl.
CPC .......... *H04L 69/18* (2013.01); *G07C 9/00571* (2013.01); *H04L 63/18* (2013.01); *H04W 12/003* (2019.01); *H04W 12/06* (2013.01); *H04W 12/08* (2013.01); *H04W 48/02* (2013.01); *G07C 2009/00825* (2013.01); *H04W 12/00502* (2019.01); *H04W 84/12* (2013.01)

(58) Field of Classification Search
CPC ..... H04L 69/18; H04W 12/08; G07C 9/00571
USPC ....................................................... 340/5.21
See application file for complete search history.

(56) References Cited

U.S. PATENT DOCUMENTS 9,807,202 B2 * 10/2017 Baumgarte ........... H04W 12/08
10,313,491 B2 * 6/2019 Baumgarte ......... H04W 12/003

* cited by examiner

*Primary Examiner* — Vernal U Brown
(74) *Attorney, Agent, or Firm* — Taft Stettinius & Hollister LLP

(57) ABSTRACT

A connecting device operating as a gateway in communicating information to a lock device using a first bandwidth wireless communication protocol, and which also operates temporarily as an access point for communicating other information with the lock device using a second bandwidth wireless communication protocol. Temporary, random credentials may be used to establish a one-time connection with the connecting device via the access point. Upon completion of the transfer of information using the second bandwidth wireless communication protocol, the access point may be terminated, and the generated credentials may become obsolete. The server may also attempt to balance a load on the server by scheduling the timing of at least certain types of communications to lock device based on matching periods of time in which usage of the lock device is low with times that would allow for a balance of the load on the server.

20 Claims, 3 Drawing Sheets

Related U.S. Application Data continuation of application No. 15/066,243, filed on Mar. 10, 2016, now Pat. No. 9,807,202.

(60) Provisional application No. 62/130,738, filed on Mar. 10, 2015.

COMMUNICATION PROTOCOLS FOR ELECTRONIC LOCKS

CROSS-REFERENCE TO RELATED APPLICATIONS

This application is a continuation of U.S. patent application Ser. No. 15/799,283 filed on Oct. 31, 2017 and issued as U.S. Pat. No. 10,313,491, which is a continuation of U.S. patent application Ser. No. 15/066,243 filed on Mar. 10, 2016 and issued as U.S. Pat. No. 9,807,202, which claims the benefit of U.S. Provisional Application No. 62/130,738 filed on Mar. 10, 2015, the contents of each application incorporated herein by reference in their entirety.

BACKGROUND

Security management systems often utilize hardware such as, for example, electronic lock devices, to control the ingress and/or egress through an entryway. The maintenance, usage, and operation of such lock devices often require that the lock devices receive various types of payloads containing information or data via wireless communications. For example, over the course of time, information stored on the memory of the lock device, including information relating to authorization to operate the lock device, may require updating. Similarly, the software used to operate the electronic lock including, for example, the firmware, may also require updating and/or other maintenance.

In an effort to conserve energy and/or extend battery life, at least certain types of devices associated with lock systems attempt to communication with and/or receive information from other devices used with the lock system via a low bandwidth wireless communication protocol such as, for example, Bluetooth low energy (BLE). However, such low bandwidth wireless communication protocols may have relatively low data transfer rates, and therefore may be relatively slow in communicating payloads having relatively large amounts or sizes of information or data to/from the lock device. The use of higher bandwidth wireless communication protocols, such as WIFI, often involves the devices scanning for detectable access points and identifying a predetermined, static service set identifier (SSID) for the detected access point. Moreover, such access points and the associated static SSIDs typically remain relatively consistently detectable as such access points generally continuously remain activated or in an powered on mode. Once the scan indicates the presence of one or more access points, and the static SSID(s) for that/those access point(s) is/are identified, the lock device may use a predefined password to establish communication with the other device or component via the access point. Thus, the continuous use and presence of such access points and the associated static SSID and static password may compromise the security of the system, including making the system potentially vulnerable to WIFI snooping.

Additionally, in a typical system, lock devices determine when the lock device is to be updated via wireless communication. Thus, when the lock device decides to establish communication in the system, such as with a system server, the lock device may initiate communication with the server. However, such timing may be problematic. More specifically, given the relatively large number of devices that may concurrently at least attempt to be in contact and/or communication with the system server, operation of the system server may be adversely impacted including, for example, overloading or slowing down the response time of the server and potentially adversely impacting operation of the server and the associated components of the system.

BRIEF SUMMARY

One aspect of the present invention is directed to a method for communicating a payload between a connecting device and a lock device. The method includes communicating one or more temporary credentials from the connecting device to the lock device using a first bandwidth wireless communication protocol. Further, the connecting device is established at least as a temporary access point for communications with the lock device that use a second bandwidth wireless communication protocol, the second bandwidth wireless communication protocol being a wireless communication protocol that is different from the first bandwidth wireless communication protocol. The lock device communicates to the temporary access point of the connecting device at least a portion of the one or more temporary credentials using the second bandwidth wireless communication protocol. Additionally, the one or more temporary credentials, which are usable for establishing a one-time communication session between the lock device and the connecting device via the access point, are authenticated. Upon authentication of the one or more temporary credentials, the payload from the connecting device is communicated to the lock device using the second bandwidth wireless communication protocol.

Another aspect of the present invention is directed to a method for communicating a payload from a connecting device to a lock device. The method includes operating the connecting device as at least a gateway for communications from the connecting device to the lock device using a first bandwidth wireless communication protocol. The method also includes generating one or more dynamic credentials for establishing a connection with only one temporary access point that is established by the connecting device. The one or more dynamic credentials are communicated to the lock device using the first bandwidth wireless communication protocol. A temporary access point is generated for communications between the connecting device and the lock device using a second bandwidth wireless communication protocol, the second bandwidth wireless communication protocol being a wireless communication protocol that is different from the first bandwidth wireless communication protocol. Further, at least a portion of the one or more dynamic credentials are used in establishing a connection between the lock device and the temporary access point for communications between the lock device and the connecting device using the second bandwidth wireless communication protocol. Additionally, the payload is communicated, using the temporary access point, from the connecting device to the lock device via the second bandwidth wireless communication protocol, and the temporary access point is terminated following receipt of the payload by the lock device.

Another aspect of the present invention is directed to a method for scheduling by a server a payload time period for communicating designated payloads to a lock device. The method includes evaluating usage information of the lock device to determine one or more times of low lock device activity. Load demands on the server are also evaluated to determine one or more server times for the delivery of the designated payload to the lock device, the one or more server times being selected time periods in which a load placed on the server corresponding to the communication of the designated payload to the lock device is balanced by other loads on the server during other time periods. The server may identify similarities in the one or more times of low lock device activity and the one or more server times to derive the payload time period, and the derived payload time period may be communicated to the lock device. During the payload time period, the lock device may inquire as to whether the server has a designated payload for the lock device and, in the event there is a designated payload, the designated payload may be communicated to the lock device the during the payload time period.

Other aspects of the present invention will become apparent by consideration of the detailed description and accompanying drawings.

Figure 1:
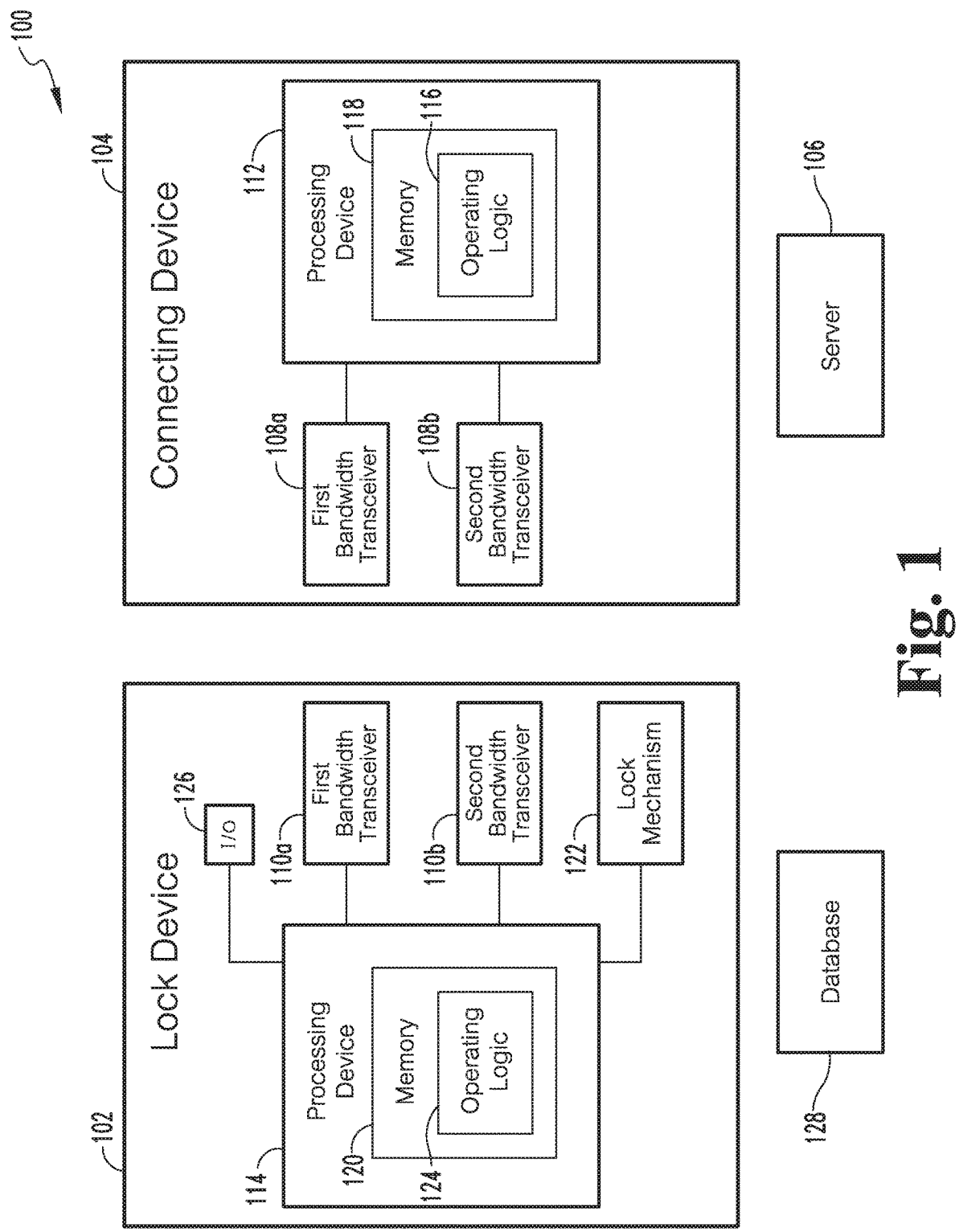
FIG. 1 a schematic diagram of an exemplary communication system that includes a lock device, a connecting device, and a server according to one embodiment of the present invention.

The foregoing summary, as well as the following detailed description of certain embodiments of the present invention, will be better understood when read in conjunction with the appended drawings. For the purpose of illustrating the invention, there is shown in the drawings certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a schematic diagram of an exemplary communication system 100 that includes a lock device 102, a connecting device 104, and a server 106 according to one embodiment of the present invention. A variety of connecting devices 104 may be utilized including, for example, a gateway, bridge, router, or switch, among other devices. According to the illustrated embodiment, the connecting device 104 may have one or more transceivers 108 for communicating data with other devices, including the lock device 102 and the server 106. Additionally, a variety of different types of transceivers 108 may be used including, for example, active and passive transceivers that may communicate via Bluetooth (including Bluetooth low energy) and/or WIFI. For example, in the illustrated embodiment, the connecting device 104 has a first transceiver 108a for communications via a first bandwidth wireless communication protocol, and a second transceiver 108b for communications via a second bandwidth wireless communication protocol, with the second bandwidth wireless communication protocol being different from the first bandwidth wireless communication protocol such as, for example, having a higher bandwidth frequency. According to certain devices, the first bandwidth wireless communication protocol may be a low bandwidth wireless communication protocol such as, for example, Bluetooth (including Bluetooth low energy), Zigbee, Near Field Communication (NFC), and/or IEEE 802.15, among other communication protocols. Further, the second bandwidth wireless communication protocol may constitute a higher bandwidth wireless communication protocol relative to the first bandwidth wireless communication protocol such as, for example, WIFI (including WIFI Direct), WI-MAX, or IEEE 802.11, among other communication protocols.

The connecting device 104 may include one or more different processing devices 112 such as, for example, programmable, dedicated, and/or hardwired state machine types of processors, as well as any combination thereof. For example, according to certain embodiments, the processing device 112 may include multiple processors and may be of a programmable variety that executes algorithms and processes data in accordance with an operating logic 116 as defined by programming instructions (such as software or firmware) stored in a memory 118.

The lock device 102 may be a lock, a reader device, a payment terminal, and/or any other type of device that can communicate with the connecting device 104. For example, in the embodiment shown in FIG. 1, the lock device 102 is an electronic lock device having one or more transceivers 110, a processing device 114, a memory 120, and a lock mechanism 122 such as, for, example, a bolt mechanism and/or a latch mechanism. The memory 120 may or may not be part of the processing device 114. In the illustrated embodiment, similar to the connecting device 104, the lock device 102 may include first and second transceivers 110a, 110b that are configured for communication with the connecting device 104 using the first and second bandwidth wireless protocols, respectively.

A variety of different types of processing devices may be used for the processing device 114 of the lock device 102 such as, for example, a programmable, dedicated, and/or hardwired state machine, or any combination thereof. The processing device 114 may further include multiple processors such as, for example, Arithmetic-Logic Units (ALUs), Central Processing Units (CPUs), Digital Signal Processors (DSPs), or the like. Processing devices 114 with multiple processing units may also utilize distributed, pipelined, and/or parallel processing. The processing device 114 may also be dedicated to the performance of just the operations described herein, or may be utilized in one or more additional applications. In the depicted form, the processing device 114 is of a programmable variety that executes algorithms and processes data in accordance with operating logic 124, as defined by programming instructions (such as software or firmware) stored in the memory 120 of the lock device 102. Alternatively or additionally, the operating logic 124 is at least partially defined by hardwired logic or other hardware. The processing device 114 may include one or more components of any type suitable to process the signals received from an input/output device 126 of the lock device 102 such as, for example, a keypad, and to provide desired output signals. Such components may include digital circuitry, analog circuitry, or a combination of both.

The memory 120 of the lock device 102 may be included with the processing device 114 and/or coupled to the processing device 114. Further, the memory 120 may be of one or more types such as, for example, a solid-state variety, electromagnetic variety, optical variety, or any combination thereof. Additionally, the memory 120 can be volatile, nonvolatile, or a combination of these types, and some or all of the memory 120 can be of a portable variety, such as a disk, tape, memory stick, cartridge, or the like. In addition, according to certain embodiments, the memory 120 can store data that is manipulated by the operating logic 124 of processing device 114, such as data representative of signals received from and/or sent to the input/output device 126 in addition to or in lieu of storing programming instructions defining the operating logic 124.

The server 106 may include one or more servers that communicate with the connecting device 104 and/or the lock device 102 in a variety of different manners including, for example, over the Internet, a cellular data network, or any combination thereof. According to certain embodiments, at least one server 106 is a cloud-based server. However, a variety of other different types of servers may also be used for the server 106 including, for example, a web-based server. Further, according to certain embodiments, different servers may be used for different purposes such as, for example, a cloud-based server for installation, maintenance, and/or management of, or relating to, the communication system 100, the connecting device 104, and/or the lock device 102, and/or a different server such as, for example, a web-based server, for other purposes such as, for example, general day-to-day usage and/or operation of the connecting device 104 and/or the lock device 102.

Figure 2:
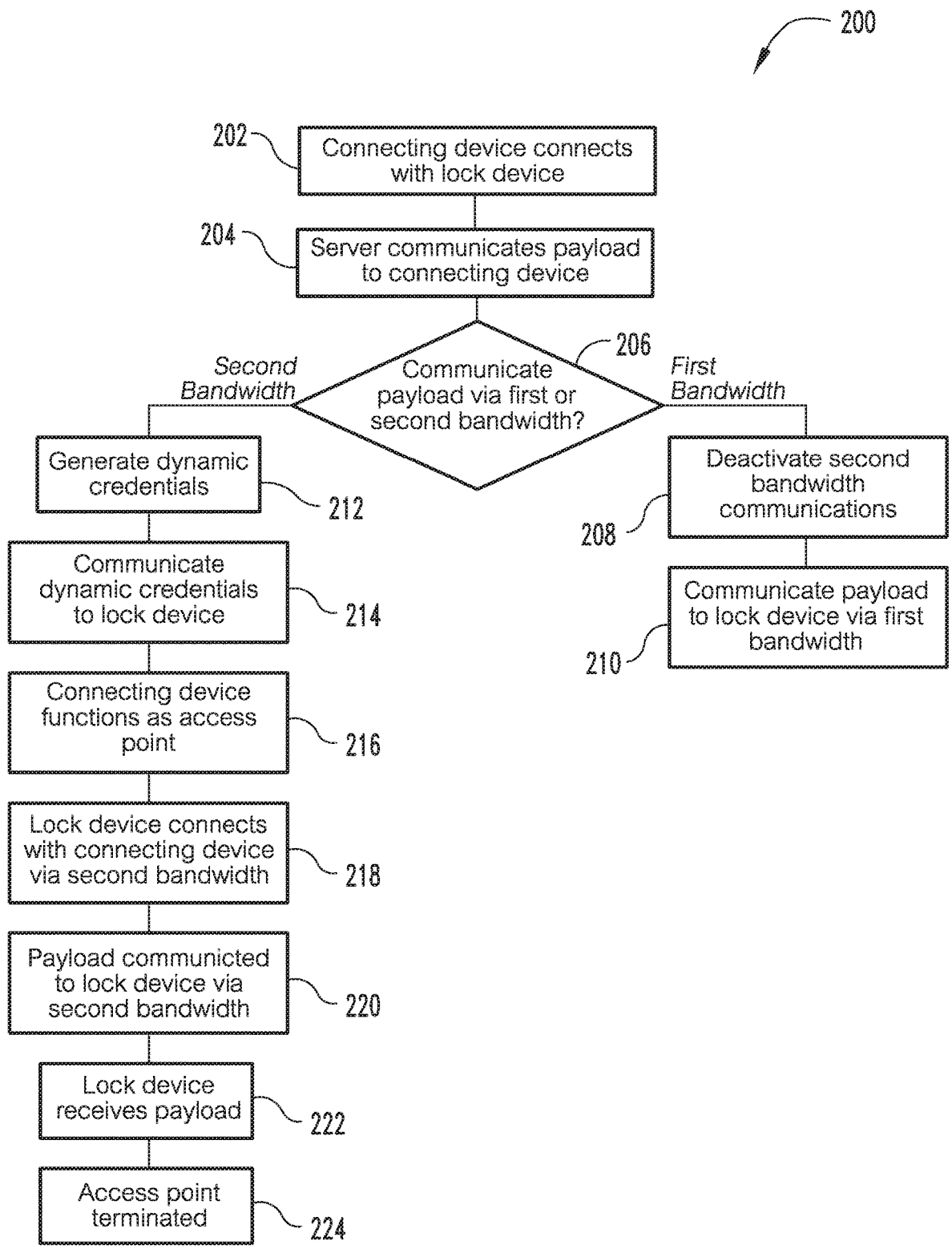
FIG. 2 illustrates a schematic flow diagram of an exemplary process for communicating information between the connecting device and the lock device according to one embodiment of the present invention.

FIG. 2 illustrates a schematic flow diagram of an exemplary process 200 for conducting transactions between the connecting device 104 and the lock device 102 accordingly to one form of the invention. Operations illustrated for all of the processes in the present invention are understood to be exemplary only, and operations may be combined or divided, and/or added or removed, as well as re-ordered in whole or in part, unless explicitly stated to the contrary. At step 202, the connecting device 104 may establish a connection with the lock device 102 so as to at least transmit communications to the lock device 102. According to the illustrated embodiment, the connection may be used to allow the connecting device 104 to communicate with the lock device 102 via the first bandwidth wireless protocol such as, for example, using Bluetooth (including Bluetooth low energy), Zigbee, Near Field Communication (NFC), and/or IEEE 802.15. Further, according to the illustrated embodiment, when using the first bandwidth wireless protocol, the connecting device 104 may function as a gateway.

At step 204, the server 106 may communicate a payload, such as information or data, to the connecting device 104. A variety of different types of information or data may be communicated in the payload to the connecting device 104 from the server 106 including, for example, updates for firmware and security settings, among other information. At step 206, a determination is made as to whether the payload communicated at step 204 is to be transmitted from the connecting device 104 to the lock device 102 via the first bandwidth wireless protocol, or via another wireless communication protocol having a larger bandwidth, such as the second bandwidth wireless communication protocol, among other protocols. A variety of different criteria may be utilized in determining which bandwidth wireless communication protocol is to be used in the transmission of the information. For example, according to certain embodiments, data or information above a certain size, such as in bytes, the nature or type of the data or information in the payload, the time lapse since or duration of the prior transmission(s), the protocol currently in use, and/or security concerns may be evaluated in determining which protocol to select for data transfer of the payload from the connecting device 102 to the lock device 104. Additionally, the decision of which communication protocol is to be used may occur at various times, and be determined by one or more components of the communication system 100. For example, according to certain embodiments, the connecting device 104 may determine upon receipt of the payload whether the payload satisfies any criteria such as, for example, the size of the payload, when determining whether to use the first or second wireless communication protocols. However, according to other embodiments, the server 106 may provide an indication or instruction to the connecting device 104 as to which wireless communication protocol is to be used to communicate the payload to the lock device 102.

According to certain embodiments, if the first wireless communication protocol is to be used to transmit the payload then, if the second wireless communication protocol is active, at step 208 the connecting device 104 may deactivate the second wireless communication protocol. More specifically, according to certain embodiments, the communication system 100, and in particular the connecting device 104, may be configured such that communications using the first and second wireless communication protocols may, or may not, occur concurrently. At step 210, the payload may then be transmitted to the lock device 102 using the first wireless communication protocol.

If, however, at step 206 the determination is made that the larger frequency of the second bandwidth wireless communication protocol is to be used to transmit the payload, then at step 212, one or more dynamic credentials may be generated that will be used to establish a connection between the connecting device 104 and the lock device 102 using the second bandwidth wireless communication protocol. For example, according to certain embodiments, a dynamic service set identifier (SSID) and a dynamic password may be generated for establishing communication between the connecting device 104 and lock device 102 that will be used to transmit at least the data or information evaluated at step 206 to the lock device 102. Thus, according to certain embodiments, the credential(s) generated at step 212 may be random, unique and/or temporary, and/or may be used for establishing a connection between the connecting device 104 and the lock device 102 for, or related to, the transmission of a particular payload of information and/or for a particular period of time. A number of devices may be utilized to generate the dynamic credentials such as, for example, the connecting device 104 and/or the server 106. However, according to other embodiments, the credentials generated at step 216 need not be dynamic or random. For example, according to certain embodiments, the credentials may be assigned to, or otherwise associated with, a particular user(s), lock device 102, and/or connecting device 104. Additionally, according to certain embodiments, the credentials utilized to establish a connection between the connection device 104 and the lock device 102 may or may not be a user controlled setting. Therefore, according to certain embodiments, the user associated with the lock device 102 and/or the connection device 104 may be able to determine whether the credentials used in establishing connections between the connection device 104 and the lock device 102 are dynamic or particular credentials that may be associated to the user, lock device 102 and/or the connecting device 104, among other associations.

At step 214, the dynamic credentials may be communicated from the connecting device 104 and received by the lock device 102 using the first bandwidth wireless communication protocol. According to certain embodiments, at step 216, the connecting device 104 may adjust from functioning as a gateway to functioning at least as an access point. For example, according to certain embodiments, at step 214, the connecting device 104 may function at least as a temporary WIFI access point for purposes of communicating the payload to the lock device 102. Further, according to certain embodiments, while functioning as an access point for at least the transmission of the payload, the connecting device 104 may also continue acting as a gateway so as to provide capability for concurrently transmitting information or data to the lock device 104 using both the first and second bandwidth wireless communication protocols. However, according to other embodiments, when the connecting device 104 is operating as at least a temporary access point for the transmission of the payload via the second bandwidth wireless communication protocol, the ability of the connecting device 104 to communicate via the first bandwidth wireless communication protocol may be deactivated or otherwise disabled or suspended. According to such embodiments, the connecting device 104 may deactivate or suspend operating as a gateway in connection with the first bandwidth wireless communication protocol, and instead operate as an access point for communications relating to the second bandwidth wireless communication protocol at a variety of different time periods including, for example, after transmitting the dynamic credentials, and/or after a connection relating to the second bandwidth communication protocol is established with the lock device 102.

With the lock device 102 being in receipt of the dynamic credentials such as, for example, the lock device 102 having received the dynamic credentials, such as a random and/or temporary static service set identifier (SSID) and password, at step 218, the lock device 102 may seek to establish a connection with the connecting device 104 using the second bandwidth wireless communication protocol. As discussed above, according to certain embodiments, with a connection between the connecting device 104 and the lock device 102 established using the second bandwidth wireless communication protocol, and with the connecting device 104 functioning as an access point, the connecting device 104 may, or may not, deactivate or suspend communications with the lock device 102 that utilize the first bandwidth wireless communication protocol.

With the lock device 102 connected to the access point, and more specifically, connected to the connecting device 104, the connecting device 104 may transmit the payload to the lock device 102 at step 220. At step 222, the lock device 102 may receive the transmitted payload. According to certain embodiments, with the payload received by the lock device 102, at step 224, the connecting device 104 may terminate the access point used to transmit the payload to the lock device 102. Such deactivation or termination of the access point may occur at a variety of different times. For example, according to certain embodiments, the connecting device 104 may terminate the access point following transmission of the payload, after a predetermined time period (such as after expiration of the time period anticipated to allow for completion of transmission of the payload from the connecting device 104) and/or upon confirmation that the lock device 102 received the payload. Further, with the access point terminated or otherwise deactivated or suspended, the dynamic credentials generated at step 212 may no longer be used to establish a connection with the connecting device 104. Instead, according to the illustrated embodiment, if and when the connecting device 104 establishes or reactivates an access point, new/different dynamic credentials will be generated and required for establishing a connection between the lock device 102 and the access point of the connecting device 104. Accordingly, the connecting device 104 may use access point(s) and associated generated dynamic credentials for one time communications, or communication sessions, with the lock device 102. Thus, according to certain embodiments, as the connecting device 104 and lock device 102 may have relatively limited communications using the second bandwidth wireless communication protocol, credentials associated with such communications such as, for example, the static service set identifier (SSID), may not only be random and/or temporarily, but may also only be in existence for relatively short periods of time before those credentials disappear with termination, deactivation, and/or suspension of the access point.

Additionally, according to certain embodiments, the timing at which the lock device 102 receives at least certain types of payloads may be controlled by the server 106. For example, according to certain embodiments, the server 106 may determine when the lock device 102 should at least attempt to connect to the server 106, such as via the connecting device 104, to obtain at least certain types of information or data. Further, according to certain embodiments, the server 106 may determine the time that the lock device 102 is to connect to the server 106 for particular types or sizes of information or data such as, for example, information or data relating to updates for security settings and/or firmware, among other types of information or data.

Figure 3:
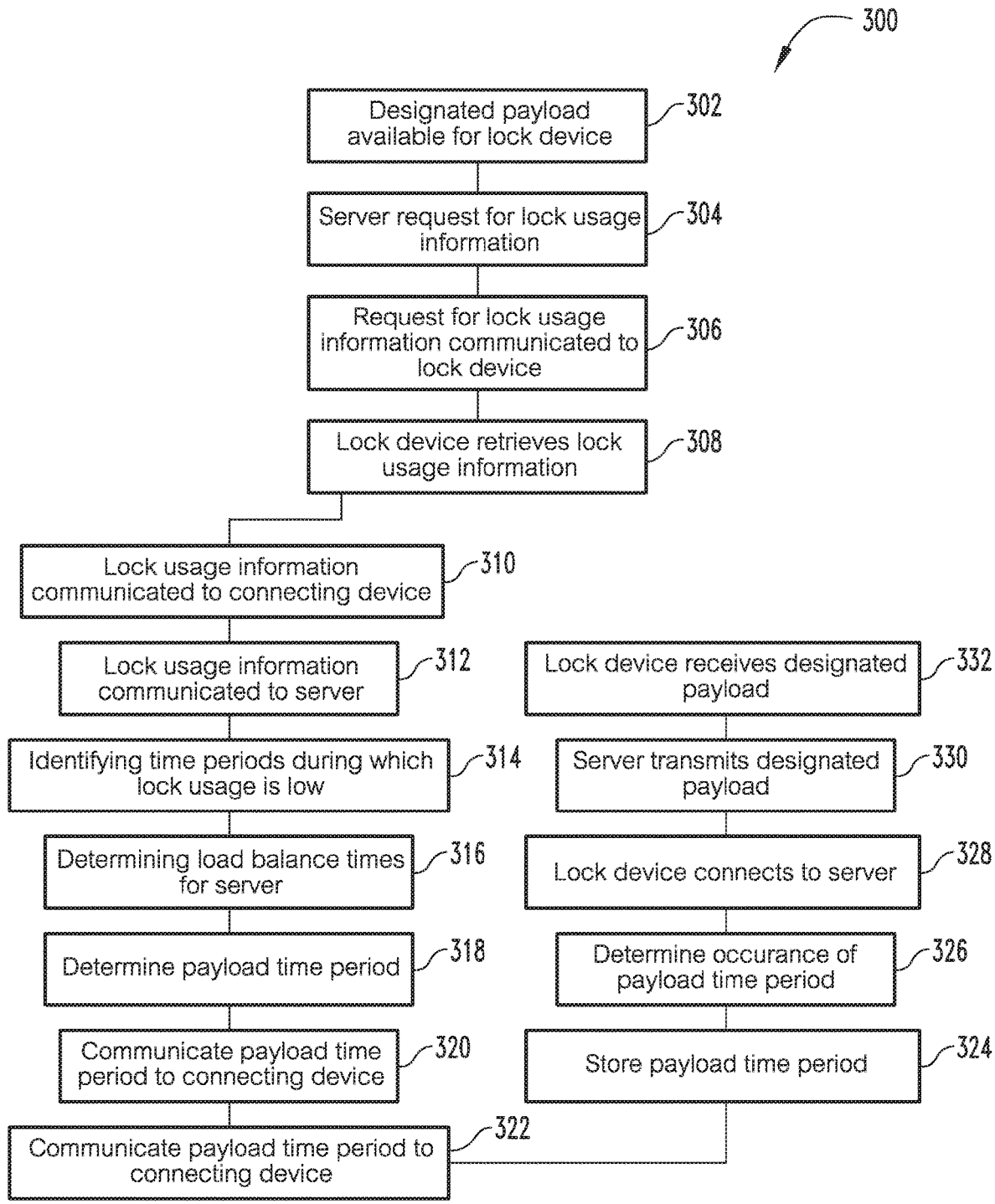
FIG. 3 illustrates a schematic flow diagram of an exemplary process for determining the timing that a lock device receives at least certain types of information from a server according to one embodiment of the present invention.

FIG. 3 illustrates a schematic flow diagram of an exemplary process 300 for determining the timing for a lock device 102 to receive at least certain types of information or data from the server 106. While the disclosed embodiments are discussed in terms of using a connecting device 104 for communications between the server 106 and the lock device 102, according to other embodiments, the server 106 and lock device 102 may be configured for direct communications between each other without the use of a connecting device 104. Once again, operations illustrated for all of the processes in the present invention are understood to be exemplary only, and operations may be combined or divided, and/or added or removed, as well as re-ordered in whole or in part, unless explicitly stated to the contrary.

At step 302, the server 106 may determine, or otherwise be instructed, that a designated payload is available for the lock device 102. According to certain embodiment, the designated payload may be a particular type of payload such as, for example, payloads of a particular type or size and/or that are resource-intensive including, for example, payloads relating to firmware or security updates, among other payloads. According to the illustrated embodiment, at step 304, the server 106 may establish a connection with the connecting device 104 so as to obtain lock usage information that relates to usage or activity of the lock device 102. For example, according to certain embodiments, the server 106 may communicate a request that seeks information or data from the connecting device 104 and/or the lock device 102 that corresponds to historical data relating to the time periods in which the lock device 102 has been operated. Such operation may include, for example, information relating to the time periods in which a user has, or has attempted, to establish a communication with the lock device 102, and/or time periods relating to a latch mechanism of the lock device 102 being displaced from locked and/or unlocked positions.

According to embodiments in which lock usage or activity information or data is provided by the lock device 102, at step 306, the connecting device 104 may communicate the request for lock usage information to the lock device 102. At step 308, the lock device 102 may retrieve the requested lock usage information such as, for example, from the memory of the lock device 102, and transmit the lock usage information to the connecting device 104 at step 310. At step 312, the connecting device 104 may transmit the requested lock usage information to the server 106. However, according to other embodiments, rather than request lock usage information from the connecting device 104 and/or the lock device 102, the server 106 may reference other information that is accessible to the server 106, such as historical information or data provided by a database 128 (as shown in FIG. 1) that correspond to usage of the lock device 102 or prior correspondence from/with the lock device 102. For example, according to certain embodiments, the server 106 may maintain a record(s) of prior communications from the lock device 102 that indicate time periods of prior usage of the lock device 102. Such records may include, but are not limited to, prior times at which the lock device 102 sought verification from the server of a user's security credentials or time periods in which the lock device 102 has sought other information from the server 106. The server 106 may then perform an audit of such historical information in connection with identifying information relating to usage or activity of the lock device 102.

At step 314, the server 106 may evaluate the lock usage information to identify periods in which usage of the lock device 102 is relatively low. Such identification of low usage time periods of the lock device 102 may provide the server 106 with an identification of time periods in which communication of at least certain types of payloads to the lock device 102 such as, for example, relatively large size payloads, may generally prevent or minimize the potential for interference with the normal operation of the lock device 102. At step 316, the server 106 may also identify time periods in which the generation and/or communication of payloads for the lock device 102 such as, for example, designated payloads, may cause relatively minimal interference with the operation of the server 106. Moreover, at step 316, the server 106 determine time periods that may be available for the server 106 to generate and/or transmit designated payloads for the lock device 102 without interfering with other demands on the server 106, including the time periods at which the server 106 is providing relatively resource-intensive payloads for other lock devices. Moreover, the server 106 may evaluate the time periods at which the server 106 may be providing designated payloads for other lock devices, including periods of peak usage or demand of/upon the server 106, as well as peak usage time periods of usage of the lock device 102 in an attempt to attain a load balance for the server 106 and/or the lock device 102. Such load balancing may allow for improved performance of the server 106 and/or the lock device 102 such as, for example, by spreading out the time periods at which the server 106 is to generate and/or communicate designated payloads, and thereby may improve the speed or responsiveness of the server 106 and associated transmission and/or downloading of the payload(s) by the lock device 102.

At step 318, the server 106 may identify a payload time period that indicates a time or period of time at which the lock device 102 is to next seek to operably connect to the server 106 to obtain a payload. For example, according to the illustrated embodiment, the server 106 may evaluate the time periods identified at steps 314 and 316, and identify time periods in which the lock device 102 has relatively low usages that are similar or common to time periods that would allow the server 106 to attain, or at least assist with seeking, a load balance relating to providing payloads for other lock devices. From such information, the server 106 may determine a payload time period during which the lock device 102 is to connect with the server 106 to download the next designated payload, if any is/are available, from the server 106. According to certain embodiments, the payload time period may be one or more times during each day, a particular day, or over a period of days, weeks, or months.

Additionally, according to certain embodiments, upon identifying the time of day for communicating payloads to the lock device 102 so as to attain a load balance, the server 106 may determine the frequency at which the lock device 102 is to contact the server 106 at the selected time of day by providing a time lapse interval. For example, the server 106 may determine that the lock device 102 is to contact the server 106 regarding available payloads, and download any such available downloads at, for example, 2:00 AM. The server 106 may then determine how often at 2:00 AM that lock device 102 is to contact the server 106 such as, for example, every day, every other day, or once a week, among other time lapse intervals. Thus, according to one example, the server 106 may set the time lapse interval at 24 hours such that the lock device 102 contacts the server 106 every day at 2:00 AM. Similarly, if the time lapse interval is 48 hours, the lock device 102 may inquire as to whether a payload is available and, if available, download the payload every other day at 2:00 AM.

Alternatively, according to certain embodiments, rather than the server 106 selecting a time of day for the lock device 102 to contact the server 106 regarding available payloads, the selected time of day may be based on a lock event such as, for example, the time of day when the lock device 102 first contacted the server 106 during, or following, initial installation of the lock device 102. Additionally, according to such embodiments, the frequency at which the lock device 102 is to contact the server 106 at the selected time of day may be based on a time lapse interval. For example, if a lock event is the first time the lock device 102 contacted the server 106, which occurred at 5:12 PM, and the time lapse interval is set at 24 hours, then the lock device 102 may contact the server 106 every 24 hours (everyday) at 5:12 PM. At step 320, the server 106 may communicate to the connecting device 104 the payload time period, and the connecting device 104 may then communicate that time period to the lock device 102 at step 322. At step 324, the lock device 102 may store the payload time period such as, for example, in the memory 120 of the lock device 102. At step 326, the lock device 102 may determine that the payload time period has arrived, and thus at step 328 may connect to the server 106 such as, for example, via the connecting device 104. With the lock device 102 operably connected to the lock device, at step 330, the server 106 may transmit the designated payload for the lock device 102. At step 332, the lock device 102 may receive the transmitted designated payload such as, for example, via a connection with the connecting device 104. Further, depending on the criteria for communication of information from the connecting device 104 to the lock device 102, the designated payload may be communicated using the first or second wireless communication protocol, as previously discussed. Thus, according to certain embodiments, the lock device 102 and the connecting device 104 may establish a connection via the second bandwidth wireless communication protocol in a manner similar to those previously discussed before the designated payload may be communicated to the lock device 102. According to certain embodiments, the communication(s) at step 332 may also include an indication of the next payload time period for the lock device 102 to seek to communicate with the server 106 when inquiring whether the server 106 has another designated payload for the lock device 102.

For example, according to certain embodiments, the timing that the lock device 102 is to inquire whether there are designated payloads relating to firmware and security updates is to be determined by the server 106. Therefore, according to certain embodiments, the server 106 may determine, based on information provided by the lock device 102 or otherwise available to the server 106, that the lock device 102 generally has a low level of usage during the evening. Further, the server 106 may also determine that there is a particular time period during the evening such as, for example, a payload time period that is at or between 11:15 PM and 11:45 PM, during which the server 106 is not scheduled to provide as many similar designated payloads, or other resource-intensive payloads, to other lock devices compared to other portions of the day and/or evening. Therefore, in at least an attempt to attain and/or maintain a load balance for the server 106, according to such an embodiment, the server 106 may determine that the lock device 102 is to inquire as to whether there are any designated payloads of information for the lock device 102 during the payload time period of 11:15 PM to 11:45 PM. While the present example provides a single time period, according to other embodiments, the time period determined by the server 106 may be one or more times during each day, a particular day, or over a particular number of days. Thus, according to the present example, the server 106 may provide a communication that instructs the lock device 102 that the lock device 102 is to seek to obtain the designated payload, if any, at or between the payload time period of 11:15 PM to 11:45 PM. Further, the lock device 102 may record the communicated payload time period. When the payload time period occurs, the lock device 102 may provide a communication to the connecting device 104 and/or server 106 inquiring as to whether there is a designated payload available for the lock device 102. If there is a designated payload for the lock device 102, the server 106 may communicate the payload to the lock device 102 such as, for example, through use of the connecting device 104. Further, as previously discussed, according to certain embodiments, the designated payload may be transmitted to the lock device 102 by the connecting device 104 using the second wireless communication protocol if the designated payload satisfies particular criteria, and/or is otherwise designated for transmission using that second wireless communication protocol.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for communicating a payload between a connecting device and a lock device, the method comprising:
   communicating temporary credential data from the connecting device to the lock device using a first bandwidth wireless communication protocol, wherein the temporary credential data are usable by the lock device to establish a communication session with the connecting device that uses a second bandwidth wireless communication protocol different from the first bandwidth wireless communication protocol;
   establishing, by the lock device, the communication session with the connecting device using the temporary credential data; and
   communicating, in response to establishing the communication session using the temporary credential data, the payload from the connecting device to the lock device using the second bandwidth wireless communication protocol.

2. The method of claim 1, further comprising evaluating the payload against payload criteria to determine whether to communicate the payload from the connecting device to the lock device via the first bandwidth wireless communication protocol or the second bandwidth wireless communication protocol; and
   wherein communicating the payload from the connecting device to the lock device using the second bandwidth wireless communication protocol is in response to determining to communicate the payload from the connecting device to the lock device via the second bandwidth wireless communication protocol based on evaluation of the payload against the payload criteria.

3. The method of claim 2, wherein the payload criteria comprises at least one of a size of the payload, a type of the payload, a time elapsed since a prior payload transmission between the connecting device and the lock device, or a protocol currently in use by the connecting device.

4. The method of claim 2, further comprising evaluating usage information of the lock device to determine a payload time period at which to establish the communication session between the connecting device and the lock device using the temporary credential data; and
   wherein establishing the communication session with the connecting device using the temporary credential data comprises establishing the communication session at the payload time period.

5. The method of claim 4, wherein evaluating the usage information of the lock device comprises:
   determining one or more times of low lock device activity of the lock device based on the usage information of the lock device;
   deriving the payload time period based on the one or more times of low lock device activity; and
   communicating the derived payload time period to the lock device.

6. The method of claim 1, wherein the second bandwidth wireless communication protocol has a higher bandwidth relative to the first bandwidth wireless communication protocol.

7. The method of claim 6, wherein the first bandwidth wireless communication protocol comprises a Bluetooth communication protocol; and
   wherein the second bandwidth wireless communication protocol comprises a WIFI communication protocol.

8. The method of claim 1, further comprising deactivating, on the connecting device, the first bandwidth wireless communication protocol; and wherein communicating the payload from the connecting device to the lock device using the second bandwidth wireless communication protocol is in response to deactivating the first bandwidth wireless communication protocol.

9. The method of claim 1, wherein communicating the payload from the connecting device to the lock device using the second bandwidth wireless communication protocol comprises communicating the payload from the connecting device to the lock device using the second bandwidth wireless communication protocol while concurrently transmitting data from the connecting device to the lock device using the second bandwidth wireless communication protocol.

10. The method of claim 1, wherein the temporary credential data is dynamically generated.

11. The method of claim 1, wherein the temporary credential data comprises a temporary service set identifier (SSID) and a temporary password.

12. A system for communicating a payload between a connecting device and a lock device, the system comprising:
  at least one processor; and
  at least one memory comprising a plurality of instructions stored therein that, in response to execution by the at least one processor, causes the system to:
    communicate temporary credential data from the connecting device to the lock device using a first bandwidth wireless communication protocol, wherein the temporary credential data are usable by the lock device to establish a communication session with the connecting device that uses a second bandwidth wireless communication protocol different from the first bandwidth wireless communication protocol;
    establish the communication session between the connecting device and the lock device using the temporary credential data; and
    communicate, in response to establishing the communication session using the temporary credential data, the payload from the connecting device to the lock device using the second bandwidth wireless communication protocol.

13. The system of claim 12, wherein the plurality of instructions further causes the system to evaluate the payload against payload criteria to determine whether to communicate the payload from the connecting device to the lock device via the first bandwidth wireless communication protocol or the second bandwidth wireless communication protocol; and
  wherein communication of the payload from the connecting device to the lock device using the second bandwidth wireless communication protocol is in response to a determination to communicate the payload from the connecting device to the lock device via the second bandwidth wireless communication protocol based on evaluation of the payload against the payload criteria.

14. The system of claim 13, wherein the payload criteria comprises at least one of a size of the payload, a type of the payload, a time elapsed since a prior payload transmission between the connecting device and the lock device, or a protocol currently in use by the connecting device.

15. The system of claim 13, wherein the plurality of instructions further causes the system to evaluate usage information of the lock device to determine a payload time period at which to establish the communication session between the connecting device and the lock device using the temporary credential data; and
  wherein to establish the communication session with the connecting device using the temporary credential data comprises to establish the communication session at the payload time period.

16. The system of claim 15, wherein to evaluate the usage information of the lock device comprises to:
  determine one or more times of low lock device activity of the lock device based on the usage information of the lock device;
  derive the payload time period based on the one or more times of low lock device activity; and
  communicate the derived payload time period to the lock device.

17. The system of claim 12, wherein the second bandwidth wireless communication protocol has a higher bandwidth relative to the first bandwidth wireless communication protocol.

18. The system of claim 12, wherein the plurality of instructions further causes the system to deactivate, on the connecting device, the first bandwidth wireless communication protocol; and
  wherein communication of the payload from the connecting device to the lock device using the second bandwidth wireless communication protocol is in response to deactivation of the first bandwidth wireless communication protocol.

19. The system of claim 12, wherein to communicate the payload from the connecting device to the lock device using the second bandwidth wireless communication protocol comprises to communicate the payload from the connecting device to the lock device using the second bandwidth wireless communication protocol while concurrently transmitting data from the connecting device to the lock device using the second bandwidth wireless communication protocol.

20. A connecting device, comprising:
  a processor; and
  a memory comprising a plurality of instructions stored therein that, in response to execution by the processor, causes the connecting device to:
    communicate temporary credential data to the lock device using a first bandwidth wireless communication protocol, wherein the temporary credential data are usable by the lock device to establish a communication session with the connecting device that uses a second bandwidth wireless communication protocol different from the first bandwidth wireless communication protocol;
    establish the communication session with the lock device using the temporary credential data; and
    communicate the payload to the lock device using the second bandwidth wireless communication protocol in response to establishing the communication session using the temporary credential data.

* * * * *